Jan. 17, 1939.  M. PAYNE  2,144,576
THERMOSTAT
Filed Oct. 23, 1937  2 Sheets-Sheet 1
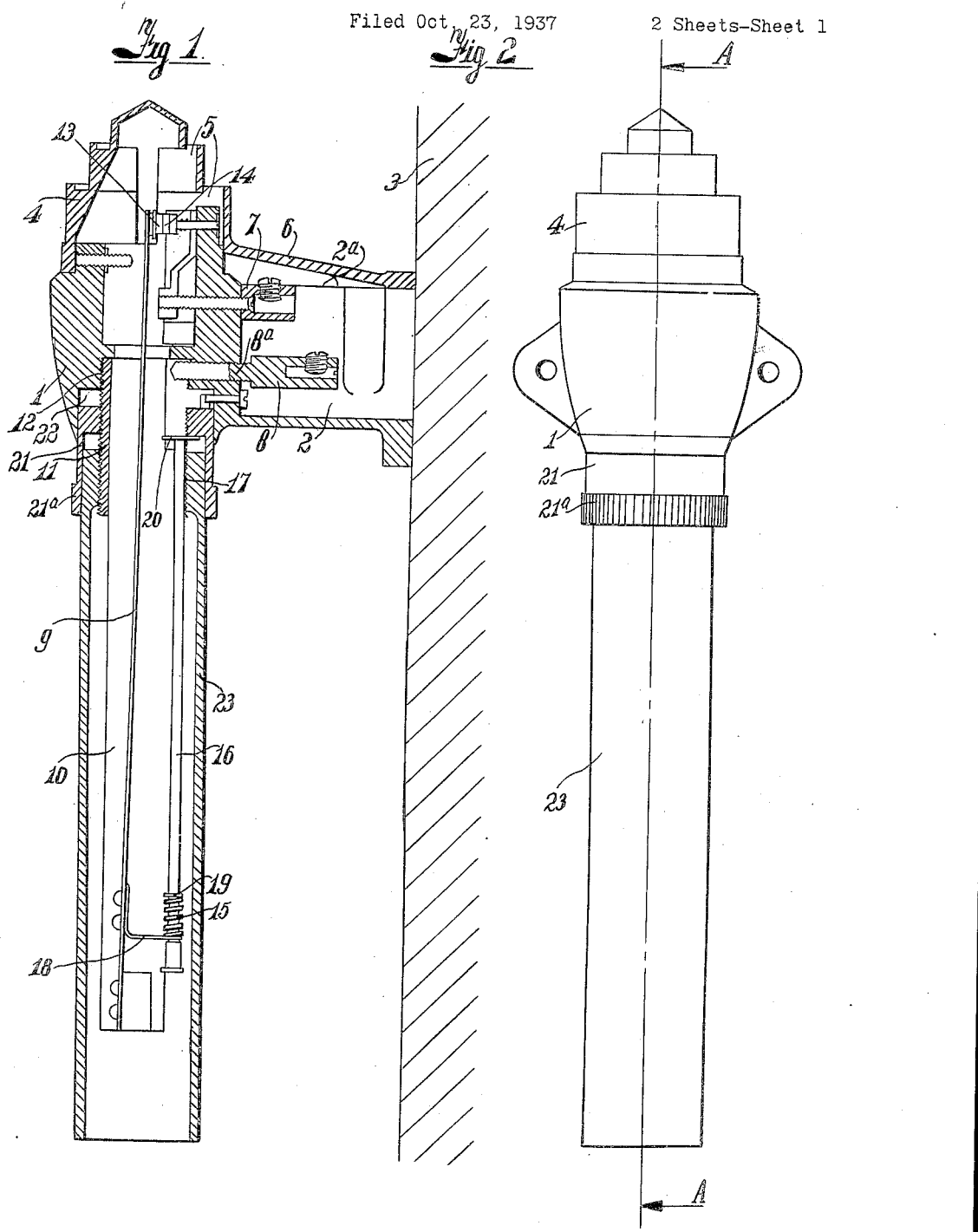
INVENTOR
Matt Payne, deceased, By
Fred Parmenter, Executor
by Norris + Bateman
Attorneys.

Jan. 17, 1939.  M. PAYNE  2,144,576
THERMOSTAT
Filed Oct. 23, 1937   2 Sheets-Sheet 2
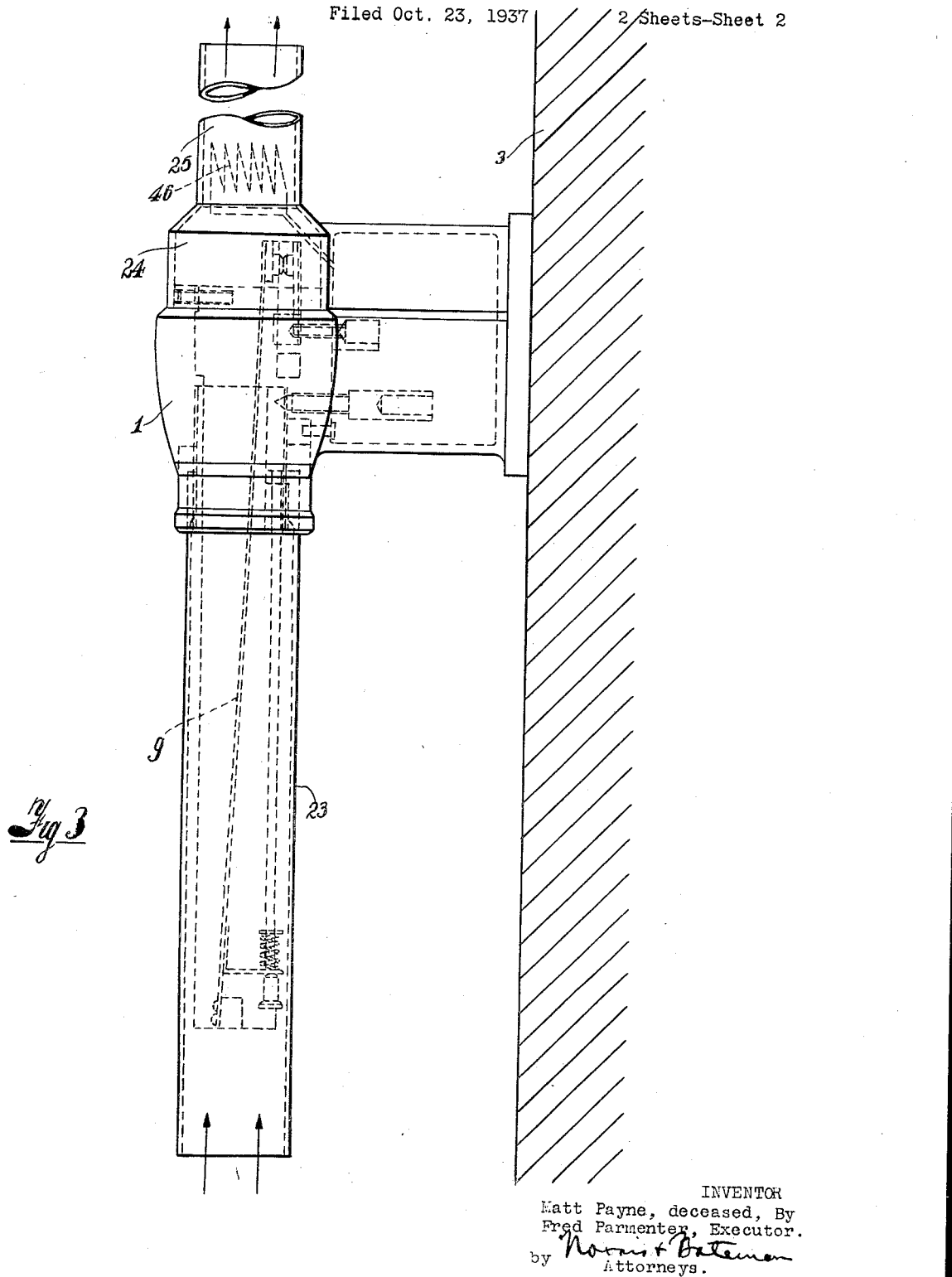
INVENTOR
Matt Payne, deceased, By
Fred Parmenter, Executor.
by Norris + Bateman
Attorneys.

Patented Jan. 17, 1939

2,144,576

UNITED STATES PATENT OFFICE 2,144,576

THERMOSTAT

Matt Payne, deceased, late of Surbiton, England, by Fred Parmenter, executor, Kingston-on-Thames, England Application October 23, 1937, Serial No. 170,701
In Great Britain June 8, 1936

1 Claim. (Cl. 297—15)

This invention relates to thermostats and has for its object to provide improvements in the construction and mounting of thermostats suitable for regulating room temperatures and for like purposes.

It is convenient and a common practice to mount a thermostat on one of the walls of a room. It seldom happens, however, that the wall temperature is the same as the room temperature. An exterior wall, for example, will be cooler in winter and warmer in summer than the interior of the room whilst built-in flues and the like may affect the temperature of an internal wall. The temperature of the thermostat may therefore differ materially from the general temperature of the room.

One improvement according to the present invention consists in supporting a thermostat from a wall or like surface in such a way that the temperature sensitive element is spaced from the wall or surface and assumes the general temperature of the room rather than the temperature of the wall or surface on which it is mounted. In order to protect the sensitive element from thermal currents flowing close to the wall or surface, the body of the thermostat containing the sensitive element is supported in such a way that convection currents flowing close to the wall or surface can pass between the wall and the body of the thermostat without flowing over and enveloping the body containing the temperature sensitive element.

A further feature of the invention consists in mounting the sensitive element of a thermostat in a tubular or flue like body or container arranged to permit of free circulation of air through the body and over the thermally sensitive element. When the thermostat is mounted on a wall or surface in the manner described above, the tubular or flue like body is spaced from the wall or surface so that the openings therein for the circulation of air are clear of the thin sheet like convection stream which flows over the surface of the wall and which is heated or cooled by the wall surface to a temperature different from that of the interior of the room.

A further feature of the invention consists in the provision of a heating device, preferably an electric resistance heater, arranged to induce a circulation of air through a chamber or casing containing the thermally sensitive element so as to promote heat exchange between the thermally sensitive element and the surrounding air. This heating element is arranged in the casing at a point above the temperature sensitive element so that the latter is not affected by the heater, the air drawn into the casing passing over the thermally sensitive element before it reaches the heating element.

The invention will now be particularly described with reference to the accompanying drawings in which:—

Figure 1 is a sectional view of a thermostat constructed according to one form of the invention, the section being taken on the line A—A of Figure 2.

Figure 2 is a front elevation of the instrument shown in Fig. 1 and

Figure 3 is a side elevation of a modified form of instrument fitted with a heater arranged to induce a circulation of air through the chamber or casing of the thermostat.

The instrument shown in Figs. 1 and 2 comprises a main body 1 in the form of a hollow moulding formed with a lateral tubular extension 2 having means for attachment to a wall or surface 3 so that the main body 1 is held spaced from the wall and clear of any convection currents induced near the surface or wall.

The top of the body 1 is covered by a removable cap 4 having openings 5 for the escape of air from the interior of the body. The tubular extension 2 is open along the top as indicated at 2a and the cap 4 is provided with an extension 6 to cover the opening. When the cap is removed the aforesaid opening permits of access to the electrical terminal connections 7 and 8 located in the tubular extension.

The thermostatic switch mechanism comprises a bimetallic strip 9 carried by an elongated support 10 preferably made of metal and formed at one end with a hollow threaded part 11 which is screwed into a socket 12 in the body 1 as shown, the arrangement being such that the part 10 depends from the body 1. The bimetallic strip is fixed at its lower end to the lower end of the support 10 and projects at its upper end through the hollow threaded part 11 into the interior of the body 1. The hollow threaded part 11 may be in the form of a hollow cylinder split or slotted longitudinally at one point so that after it has been screwed into position, it can be expanded by means of a coned end of a pin screwed into a lateral opening in the wall of the main body. This pin may conveniently be the pin 8a carrying the terminal member 8 as shown in Figure 1 of the drawings so that it serves not only to lock the elongated support in position, but also to make connection through the support to the bimetallic strip and thence to a moving contact 13 mounted on the free end of the strip.

The contact 13 co-operates with a fixed contact 14 mounted in the body 1 and electrically connected to the terminal contact 7.

For the purpose of adjusting the bimetallic strip, a bushing 21 is screwed on to the part 11 so that the bushing enters into a recess 22 provided for it in the body 1. The part of the bushing which projects from this recess is formed with a knurled ring 21a so that the bushing can be rotated by hand.

The movements of the bushing 21 are imparted to the bimetallic strip through the medium of a push rod 16, the upper end of which is guided in a groove 17 formed in the part 11 and the lower end of which is guided in a hole in a bracket 18 fixed to the bimetallic strip 9 near the fixed end thereof. The rod 16 acts on the bracket 18 through the medium of a compression spring 15 mounted on the rod 16 and acting between the bracket 18 and a collar 19 fixed to the rod 16. The upper end of the rod 16 carries a disc or plate 20 which is accommodated in a recess formed in the wall of the part 11 and which bears against the bushing 21 as shown. When the bushing 21 is rotated so as to cause it to move downwards on the part 11, downward movement is imparted to the push rod 16 and thence through the spring 15 to the bracket 18 so that the bimetallic strip is deflected and the working temperature is thus adjusted.

The parts of the support 10, bimetallic strip 9 and rod 16 which project downwards from the body 1 are enclosed in an open-ended tubular casing 23 screwed to the part 11, the upper end of this tubular casing being received within the bushing 21 as shown.

The construction shown in Figs. 1 and 2 of the drawings provides for free circulation of air through the casing 23 and body 1 for the purpose of facilitating heat exchange between the bimetallic strip and the air in the room or enclosure in which the thermostat is mounted. The body 1 and casing 23 are so spaced from the wall or surface 3 by means of the tubular extension 2 that the openings in the cover 4 and casing 23 provided for the circulation of air are clear of the thin sheet-like convection stream which flows over the wall or surface 3 and which may be heated or cooled by the surface 3 to a temperature different to that of the interior of the room.

The instrument shown in Fig. 3 of the drawings is generally similar to that shown in Figs. 1 and 2 and embodies a thermostat switch comprising a bimetallic strip 9 and adjusting mechanism therefor constructed and adapted to operate in the manner already described with reference to Figs. 1 and 2 of the drawings. In this modified instrument, however, the place of the cover 4 is taken by a cover 24 fitted with a tubular flue like extension 25 in which a heater in the form of an electrical resistance element 46 is mounted. The heater 46 induces a vigorous circulation of air through the casing and thereby promotes heat exchange between the bimetallic strip 9 and the surrounding air.

Since the heating element 46 is located at a point above the bimetallic strip 9, the latter is not materially affected by the heater, the air from the interior of the room or enclosure being drawn into the casing 23 through the bottom end thereof and passing over the bimetallic strip 9 before it reaches the heater 46.

It is claimed:—

A wall thermostat comprising a flue-like elongated tubular casing having an air inlet at one end and an air outlet at its other end for the circulation of a current of air through said casing, a spacing member attached to said casing at a point remote from the air inlet end thereof for spacing said casing from the wall surface to which the thermostat is attached so that the air inlet end of said casing projects downwardly from the spacing member and a free air space is provided between the downwardly projecting part of the casing and the wall surface to which the thermostat is attached, a bimetallic strip extending longitudinally in and connected at one end to the casing, and a device for adjusting said strip comprising a rod extending longitudinally in the casing and having a yieldable connection at one end to the bimetallic strip in proximity to its connection to the casing, and an annular rotatable adjusting member disposed coaxially of and surrounding the tubular casing and having a threaded connection with the casing to move longitudinally thereof and to act upon said rod to impart longitudinal movement thereto.

FRED PARMENTER,
*Executor of the Estate of Matt Payne, Deceased.*